United States Patent [19]

Yonezawa et al.

[11] 4,334,036

[45] Jun. 8, 1982

[54] PROCESS FOR PRODUCING CURABLE VINYL POLYMER HAVING SILYL GROUP

[75] Inventors: Kazuya Yonezawa; Hisao Furukawa; Masaaki Azuma, all of Kobe, Japan

[73] Assignee: Kanegafuchi Kagaku Kogyo Kabushiki Kaisha, Osaka, Japan

[21] Appl. No.: 167,657

[22] Filed: Jul. 11, 1980

Related U.S. Application Data

[63] Continuation of Ser. No. 936,628, Aug. 24, 1978, abandoned.

[51] Int. Cl.$^3$ .......................... C08F 8/34; C08F 8/42; C08F 236/02
[52] U.S. Cl. .................................... 525/102; 525/100; 525/105
[58] Field of Search ................. 525/102, 105; 526/100

[56] References Cited

U.S. PATENT DOCUMENTS

| | | | |
|---|---|---|---|
| 2,723,987 | 11/1955 | Splier | 260/448.2 |
| 2,970,150 | 1/1961 | Bailey | 260/448.2 H |
| 3,296,196 | 1/1967 | Lamoveaux | 260/448.2 B |
| 3,503,943 | 3/1970 | Kresge et al. | 260/80.78 |
| 4,191,713 | 3/1980 | Yonezawa et al. | 525/342 |
| 4,191,714 | 3/1980 | Yonezawa et al. | 525/102 |
| 4,291,136 | 9/1981 | Keogh | 525/102 |

FOREIGN PATENT DOCUMENTS 1090328  11/1967  United Kingdom ................ 525/105

*Primary Examiner*—William F. Hamrock

*Attorney, Agent, or Firm*—Moonray Kojima

[57] ABSTRACT

A curable vinyl polymer having at least one silyl group of the formula:

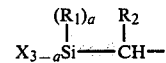

wherein $R_1$ and $R_2$ are each a hydrogen or a monovalent hydrocarbon radical having 1 to 10 carbon atoms, X is a group selected from halogen, alkoxy, acryloxy, aminoxy, phenoxy, thioalkoxy and amino groups; and "a" is a whole number equal to 0, 1 or 2, and having molecular weight of between 200 and 30,000, preferably between 1,500 and 25,000; and method for producing same, and products comprised of same; and wherein said method comprises reacting hydrosilane represented by the formula:

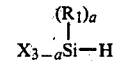

wherein the same designations as above apply, with a polymer having carbon-carbon double bonds in the terminal or side chains of the polymer in which the main chain is a vinyl polymer having a molecular weight of between 200 and 30,000, and at a temperature of between 50° and 150° C.

5 Claims, No Drawings

1

PROCESS FOR PRODUCING CURABLE VINYL POLYMER HAVING SILYL GROUP

This is a continuation of application Ser. No. 936,628, filed Aug. 24, 1978 abandoned.

BACKGROUND AND SUMMARY OF THE INVENTION

This invention relates to novel vinyl resins, a process for producing the same, and coatings comprising the same.

The resins of this invention are vinyl resins having a molecular weight of between 200 to 30,000, more preferably between 1,500 to 25,000, and having at least one silyl group represented by the formula:

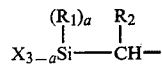

$$X_{3-a}Si\text{---}CH\text{---}$$
with $(R_1)_a$ on Si and $R_2$ on CH wherein $R_1$ and $R_2$ are each a hydrogen or a monovalent hydrocarbon group selected from alkyl groups having 1 to 10 carbon atoms, aryl groups and aralkyl groups; X is a group selected from halogen, alkoxy, acyloxy, aminoxy, phenoxy, thioalkoxy and amino groups; and "a" is an integer of 0, 1 or 2, in the molecule.

Prior to this invention, although various kinds of vinyl resins have been used in large quantities, such as thermoplastic resins, a silisyl group containing vinyl polymer, such as used in this invention, has never been known.

This invention aims to provide a novel vinyl polymer having silyl group in the terminals or side chains, which is curable upon exposure to moisture at room temperature; and a process for producing the same. A composition comprised essentially of the inventive polymer may be used as an excellent paint or coating material.

Accordingly, the inventive resins are advantageous as resins for solventless paint or coatings, or high solid coating. Such uses are quite advantageous from the view point of substantial reduction or elimination of air pollution and economization of resources. Particularly, since the resins of the present invention have a low molecular weight, as compared to prior vinyl resins, they are easily applied to solventless types or high solid types of coatings. This is a great commercial advantage.

The silyl group containing vinyl resins of the present invention are novel materials. The structure of the resins and descriptions of the process for producing same are set forth hereinbelow and in the Examples.

The silyl group containing vinyl resins are easily produced by reacting a hydrosilane compound represented by the formula:

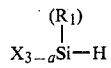

$$X_{3-a}Si\text{---}H$$
with $(R_1)$ on Si with a vinyl resin having carbon-carbon double bonds, in the presence of a catalyst, such as a member of the Group VIII transition metals or complexes thereof. Examples of such catalyst may be found, for example, in Bulletin of the Association For Organo-Synthetic Chemistry (Japan), Vol. 28, pages 918 et seq.

DETAILED DESCRIPTION OF PREFERRED EMBODIMENTS

The hydrosilane compounds used in the present invention have the following general formula:

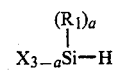

$$X_{3-a}Si\text{---}H$$
with $(R_1)_a$ on Si wherein $R_1$ is a monovalent hydrocarbon group, such as alkyl, aryl or aralkyl radical, having 1 to 10 carbon atoms; X is a group selected from halogen, alkoxy, acyloxy, aminoxy, phenoxy, thioalkoxy, amino groups and mixtures thereof; and "a" is a whole number 0, 1 or 2.

Examples of hydrosilane compounds included in this general formula include halogenosilanes such as trichlorosilane, methyl dichlorosilane, dimethyl chlorosilane or phenyl dichlorosilane; alkoxysilanes such as trimethoxysilane, triethoxysilane, methyl diethoxysilane, methyl dimethoxysilane, or phenyl dimethoxysilane; acyloxysilanes such as triacetoxysilane, methyl diacetoxysilane or phenyl diacetoxysilane; and various kinds of silanes such as triaminoxysilane, methyl diaminoxysilane and methyl diaminosilane.

Although the hydrosilane compounds can be used in a suitable amount based on the carbon-carbon double bond included in vinyl resins, use of 0.5 to 2 times by mol is preferred. Although use of silanes in amounts more than the above are possible, they are only recovered as unreacted hydrosilanes.

Further, as the hydrosilane compounds in the present invention, halogenosilanes having high reactivity which are inexpensive fundamental raw materials, can be readily used.

Although the silyl group containing vinyl resins obtained when using halogenosilanes, cure rapidly at normal temperature with generation of hydrogen chloride when exposed to moisture in the air, they can be practically used for only limited uses because of problems involving a stimulative odor or corrosion resulting from hydrogen chloride. Accordingly, it is preferred to convert, continuously, the halogen functional groups into other hydrolyzable functional groups.

As the hydrolyzable functional groups, there are alkoxyl groups, acyloxy groups, aminoxy groups, phenoxy groups, thioalkoxy groups and amino groups.

As methods of converting the halogen functional groups into hydrolyzable functional groups, there are those which comprise reacting the halogen functional groups with (1) alcohols or phenols such as methanol, ethanol, 2-methoxyethanol, sec-butanol, tert-butanol or phenol, (2) alkali metal salts of alcohols or phenols or (3) alkyl orthoformates, such as methyl orthoformate or ethyl orthoformate.

As methods of converting into acyloxy groups, there are those which comprise reacting the halogen functional group with (1) carboxylic acids such as acetic acid, propionic acid or benzoic acid; or (2) alkali metal salts of carboxylic acids.

As methods of converting into aminoxy groups, there are those which comprise reacting the halogen functional group with (1) hydroxylamines such as N,N-dimethyl hydroxylamine, N,N-diethyl hydroxylamine, N,N-methylphenyl hydroxylamine or N-hydroxypyrrolidine; or (2) alkali metal salts of hydroxylamines.

As methods of converting into amino groups, there are those which comprise reacting the halogen functional group with (1) primary or secondary amines, such as N,N-dimethylamine, N,N-methylphenylamine or pyrrolidine; or (2) alkali metal salts of primary or secondary amines.

As methods of converting into thioalkoxy groups, there are those which comprise reacting the halogen functional group with (1) thioalcohols or thiophenols such as ethyl mercaptan or thiophenols or (2) alkali metal salts of thioalcohols or thiophenols.

Concerning silyl groups introduced into the vinyl resins by hydrosilylation reactions, not only the halogen functional groups are converted into other hydrolyzable substituents, but also other groups, such as alkoxy groups or acyloxy groups may be converted, if necessary, into hydrolyzable groups such as amino groups or amino groups.

Preferred temperatures for converting the hydrolyzable functional groups on silyl groups introduced directly by such hydrosilylation reactions into other hydrolyzable functional groups, are within the range of 50° to 150° C. Furthermore, although these conversion reactions may be carried out with or without using solvents, inert solvents such as ethers, hydrocarbons or acetates are preferred when the solvents are used.

As the vinyl polymers used to be sililized in the present invention, there is no limitation, and polymers which comprise a homopolymer or copolymer of monomer(s) (i.e. monomer or monomers) (A) such as methyl acrylate, methyl methacrylate, butyl acrylate, butyl methacrylate, acrylic acid, methacrylic acid, acrylonitrile, styrene, α-methyl styrene, alkyl vinyl ether, vinyl chloride, vinyl acetate, vinyl propionate, ethylene, maleic acid, maleic acid anhydride, as a main component, are preferred. In carrying out production of the homopolymer or copolymers of these vinyl compounds, it is preferred to introduce the carbon-carbon double bonds for hydrosilylation reactions into the vinyl polymers by copolymerizing a monomer (or monomers) (B) having two non-conjugated carbon-carbon double bonds in a molecule with the above monomer or monomers (A), (A) being a monomer compound having one ethylenically unsaturated double bond in a molecule. There are wide variety of such monomers available for this purpose. Among them it is preferred to employ the monomer having two allyl type group of the formula:

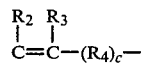

wherein $R_2$ and $R_3$ are each a hydrogen or a monovalent hydrocarbon radical having 1 to 10 carbon atoms such as alkyl, aryl or aralkyl groups; $R_4$ is a divalent hydrocarbon having 1 to 10 carbon atoms; and "c" is 0 to 1. Typical examples are allyl acrylate, allylmethacrylate, diallyl phthalate and mixtures thereof, which after hydrosilation provide a silyl group of the formula:

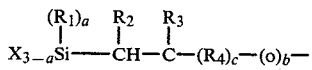

wherein "b" is a whole number 0 or 1.

It is easy and thus profitable to adjust numbers of the silyl group content of the final product by adjusting the amount of monomer or monomers in copolymerization of monomer or monomers (A) and (B).

In this process this is easily determined since the amount is approximately equivalent in mols to the double bonds which are introduced into a molecule. The numbers of double-bonds to be introduced are correspondingly determined to the numbers of silyl groups of the final product, the latter numbers being in accordance with the objects of the final polymer. Generally speaking, one would have the advantages of the present process when the monomer mixtures comprising 1 to 95% by weight of monomer or monomers (A) and 5 to 99% by weight of the monomer or monomers (B), more preferably 30 to 93% by weight of the former and 7 to 70% by weight of the latter, are polymerized. For polymerization of these monomers, conventional methods can be applied. Furthermore, in order to obtain vinyl polymers having less than 30,000, or more preferably less than 25,000, molecular weight, a chain transfer agent such as n-dodecyl mercaptan or i-dodecyl mercaptan may be added, if desired.

In carrying out polymerization of these vinyl compounds, although it is not always necessary to use solvents, it is preferred to use inert solvents, such as ethers, hydrocarbons or acetates in case solvents are employed.

In the present invention, a transition metal complex catalyst is usually needed in a stage or reacting the hydrosilane compound with the carbon-carbon double bond. As the transition metal complex catalyst, complex compounds of Group VIII transition metal, selected from platinum, rhodium, cobalt, palladium and nickel, are effectively used. This hydrosilylation reaction is carried out at a suitable temperature within the range of 50° to 150° C. and the reaction time thereof is 1 to 4 hours.

The silyl group containing vinyl resins of the present invention can be produced by the following processes beside those above described:

(1) Various vinyl compounds are subjected to radical polymerization with one kind of vinyl group containing silyl compound selected from the group consisting of vinyl trichlorosilane, vinyl triethoxysilane, vinyl trimethoxysilane, vinyl tris-(β-methoxyethoxy)-silane, γ-methacryloxypropyl trimethoxysilane and mixtures of two or more of the foregoing.

(2) In carrying out polymerization of various vinyl compounds, glycidyl acrylate or glycidyl methacrylate is copolymerized and the resulting resin is subjected to reacting with γ-aminopropyl trimethoxysilane in an equimolar amount based on the oxirane ring in the resulting resin.

It is preferred for paint or coating materials of this invention, that the resulting vinyl polymers containing the silyl group have 300 to 2500 molecular weight per one silyl group. Further the resulting silyl group containing vinyl polymers may be used directly as coating or by dissolving in a solvent so as to have a suitable viscosity. Although the amount of the solvent varies according to the molecular weight of the resulting silyl group containing polymer or purpose of use, a range of 0 to 60% by weight is preferred. As the solvent, although solvents used generally can be used, aromatic type solvents are not preferred, from the view point of public nuisance; and acetic acid esters, ethers and aliphatic hydrocarbons are preferred.

The vinyl polymer containing silyl group of the present invention, cures by forming a network structure at room temperature when exposed to the atmosphere. Since the hardening rate in this case changes according to the temperature of the atmosphere, relative humidity and species of hydrolyzable group, it is necessary to sufficiently consider the species of the hydrolyzable group, particularly, when used.

In carrying out hardening of the silyl group containing vinyl resins of the present invention, a hardening accelerator may be used or not used. In the case of using a hardening accelerator, it is effective to use alkyl titanates, metal salts of carboxylic acids, such as tin octylate or dibutyl tin laurate; amines such as dibutylamine-2-hexoate; and other acid catalysts and basic catalysts. These hardening accelerators are preferred to be used in an amount of 0.001 to 10% by weight based on said resins.

The silyl group containing vinyl resins of the present invention are useful as coatings. As described in the Examples, the resins harden rapidly at normal temperatures to form coating films having excellent surface lustre.

Various fillers and pigments may be added to the novel vinyl resins of the present invention. As fillers and pigments, it is possible to use various materials, such as various kinds of silica, calcium carbonate, magnesium carbonate, titanium oxide, iron oxide, or glass fiber, etc. Thus, they are not only applied to the above describe uses, but are also useful as coating composition for aircrafts, buildings and cars, sealing compositions and agents for surface treatment of various inorganic materials.

In the following, actual examples are described.

EXAMPLE 1

0.2 mols of methyl methacrylate, 0.086 mols of allyl methacrylate and 5 g of n-dodecyl mercaptan are dissolved in 70 ml of toluene. 0.5 g of azobisisobutylonitrile is added thereto to carry out the reaction at 80° C. for 4 hours (in the subsequent hydrosilylation reaction, this toluene solution can be used as it is). The solvent is removed under reduced pressure to obtain an allyl type unsaturation group containing acrylic polymer having about 2000 molecular weight. In the infrared absorption spectrum of this polymer, the absorption of 1648 cm$^{-1}$ by the carbon-carbon double bond is observed besides the strong absorption of 1730 cm$^{-1}$ by the ester.

EXAMPLE 2

0.2 mols of methyl methacrylate, 0.086 mols of allyl acrylate and 5 g of n-dodecyl mercaptan are dissolved in 70 ml of toluene. 0.5 g of azobisisobutyronitrile is added thereto to carry out the reaction at 80° C. for 4 hours, by which an acryl type unsaturation group containing acrylic polymer having about 2000 of the molecular weight is obtained. In the infrared absorption spectrum of this polymer, the absorption of 1648 cm$^{-1}$ by the carbon-carbon double bond is observed.

EXAMPLE 3

0.1 mols of methyl methacrylate, 0.1 mols of styrene, 0.086 mols of allyl methacrylate and 5 g of n-dodecyl mercaptan are dissolved in 70 ml of toluene, and 0.5 g of azobisisobutylonitrile is added thereto to carry out the polymerization at 80° C. for 4 hours, by which a vinyl copolymer having 2000 molecular weight is obtained. 1648 cm$^{-1}$ of the absorption by the carbon-carbon double bond is observed in this copolymer.

EXAMPLE 4

To 20 g of the toluene solution of the acrylic polymer obtained in Example 1, 1.6 ml of methyl dichlorosilane and 0.0001 g of chloroplatinate were added. The mixture was subjected to reaction at 90° C. for 3 hours under a sealed state. After the reaction, 5 ml of methanol and 5 ml of methyl orthoformate were added thereto, and the solution was stirred until the pH thereof became neutral. In the infrared absorption spectrum of the resulting compound, after the hydrosilylation reaction, the absorption of 1648 cm$^{-1}$ completely disappeared. When this resin was exposed to the atmosphere after adding 2% by weight of dibutyl tin maleate, the resin became a tack free state after about 30 minutes and hardened.

It is understood from the above observation that the resulting resin is a silyl group containing acrylic polymer.

EXAMPLE 5

When the hydrosilylation reaction was carried out by the same manner as in Example 4 with using 1.8 ml of methyl diethoxysilane instead of methyl dichlorosilane, the absorption of 1648 cm$^{-1}$ in the infrared absorption spectrum disappeared similarly, by which it was ascertained that a silyl group containing acrylic polymer was obtained.

EXAMPLES 6 and 7

Room temperature setting polymers were produced by carrying out the same hydrosilylation reaction of polymers obtained in Examples 2 and 3, as in Example 4.

EXAMPLE 8

20 g of methyl methacrylate and 20 g of diallylphthalate are dissolved into 40 ml of toluene, and then 4 g of n-dodecylmercaptan and 0.4 g of azobisisobutyronitrile are added thereto. After the polymerization of the above monomers of the resulting mixture at 80° C. for three hours, a copolymer having a molecular weight of about 1100 was obtained.

In the infrared spectrum of this polymer, the absorption of about 1640 cm$^{-1}$ by the carbon-carbon double bond and 750 cm$^{-1}$ by the ortho-substituted benzene nucleus are observed as well as 1730 cm$^{-1}$ by the ester bond. The iodine value of the copolymer was 44.9.

To 33 g of the thus prepared copolymer 7.3 g of methyl dichlorosilane and 0.0001 g of chloroplatinate were added. The mixture was subjected to reaction at 90° C. for 3 hours under a sealed state. After the reaction, 5 ml of methanol and 5 ml of methyl orthoformate were added thereto and the solution was stirred until it showed neutral in pH. In the infrared spectrum of the resulting compound after the hydrosilation reaction, the absorption of about 1640 cm$^{-1}$ disappeared completely. The iodine value was 3.8. So it is understood that more than 90% of the carbon-carbon double bond was reacted with the hydrosilane.

EXAMPLE 9

0.25 mol of methyl methacrylate, 0.11 mol of n-butyl methacrylate, 0.08 mol of allyl methacrylate and 2.5 g of n-dodecyl mercaptan were dissolved into 75 g of butylacetate. After adding 1.0 g of azobisisobutyronitrile the resulting mixture was subjected to polymerization reaction at 70° C. for 4 hours, and then a vinyl polymer containing allyl radicals and having a molecular weight of about 6000 was produced. In the infrared spectrum the absorption of 1648 cm$^{-1}$ by carbon-carbon double bond was observed.

To 20 g of the reacted product of the butyl acetate solution, 1.4 ml of methyl dichlorosilane and 0.0006 g of chloroplatinate were added and then the resulting solution was subjected to reaction at 80° C. for 4 hours under a sealed state. In the infrared spectrum of the thusly obtained polymer, the absorption of 1648 cm$^{-1}$ disappeared completely. It was calculated that the molecular weight for one silyl group is 780. It was observed that this polymer rapidly cured to harden when exposed in air.

EXAMPLE 10

A solution was prepared to contain 0.26 mol of methyl methacrylate, 0.13 mol of n-butyl acrylate, 0.014 mol of acrylic acid, 0.05 mol of allyl methacrylate, 1.5 g of n-dodecyl mercaptan and 1 g of azobisisobutylonitrile. The solution was added in a dropwise manner succeedingly for 8 hours into 75 g of butyl acetate which had been heated to 70° C. and the resulting mixture was subjected to polymerization reaction. After 8 hours, a vinyl polymer containing allyl radicals and having a molecular weight of about 10,000, was obtained.

To 20 g of the thusly reacted solution of butylacetate, 1.1 ml of methyl dimethoxysilane and 0.0004 g of chlorolatinate were added and then the mixture was subjected to reaction at 80° C. for 4 hours under a sealed state. The polymer here obtained does not show at all the absorption of 1048 cm$^{-1}$ in the infrared spectrum which had been observed before the hydrosilation reaction. The final product of this example has a molecular weight for one silyl radical of 1200.

EXAMPLE 11

The same procedure as in Example 2 was repeated except that the mixture containing 0.08 mol of methyl methacrylate, 0.05 mol of n-butyl acrylate, 0.07 mol of n-butyl methacrylate, 0.15 mol of styrene, 0.05 mol of maleic acid anhydride, 0.08 mol of allylmethacrylate, 1.5 g of n-dodecyl mercaptan and 1 g of azobisisobutylonitrile was subjected to polymerization reaction, and a vinyl polymer containing allyl radicals suspended to the main chain, and having a molecular weight of about 10,000, was obtained. Subsequently, the vinyl polymer was reacted with hydrosilane to prepare a curable polymer having a molecular weight for one silyl group of about 750.

EXAMPLE 12

The chlorine atoms of the sililized polymer obtained in Example 9 may be converted into other hydrolyzable groups. In Table 1, there are listed illustratively various hydrolyzable groups which can easily be derived onto the silicon atom to replace the chlorine atom on it, and wherein reagents in the Table were thus used in excess of more than equi-molar ratio to the chlorine.

TABLE 1

| Reagent System | Hydrolyzable Groups on silicon atom. |
|---|---|
| CH$_3$OH | —OCH$_3$ |
| 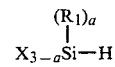—OH | —O—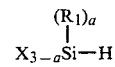 |
| C$_4$H$_9$SH | —SC$_4$H$_9$ |

TABLE 1-continued

| Reagent System | Hydrolyzable Groups on silicon atom. |
|---|---|
|  | |

EXAMPLE 13 (Example of coating)

2 parts of dibutyl tin maleate were added to 100 parts of polymers in Examples 4–8, 10 and 11. They were applied to mild steel plates, and film forming ability and properties thereof were measured. The results are shown in the following table. The resulting coating films had film thicknesses within the range of 0.01 to 0.1 mm.

| Polymer | Tack free time | Leaving time* | Hardness | Surface luster |
|---|---|---|---|---|
| Example 4 | 30 min. | 48 hrs. | H | Excellent |
| Example 5 | 40 min. | 48 hrs. | H | Excellent |
| Example 6 | 30 min. | 48 hrs. | H | Excellent |
| Example 7 | 45 min. | 72 hrs. | H-2H | Excellent |
| Example 8 | 30 min. | 48 hrs. | 2H | Excellent |
| Example 10 | 45 min. | 72 hrs. | 2H | Excellent |
| Example 11 | 30 min. | 48 hrs. | 2H | Excellent |

Note:
*Leaving at 25° C. and 70% humidity.

The inventive polymer, advantageously, has a molecular weight of between 200 and 30,000, and more preferably between 1,500 and 25,000.

The foregoing description is illustrative of the principles of the invention. Numerous variations and modifications thereof would be apparent to the worker skilled in the art. All such variations and modifications are to be considered to be within the spirit and scope of the invention.

What is claimed is:

1. A process for producing vinyl polymer having a silyl group for use as a coating material, which comprises reacting at 50° to 150° C. for a period of from 1 to 4 hours, and in the presence of a catalyst selected from a member of the group VIII transition metals or complexes thereof, a hydrosilane compound represented by the formula:

$$X_{3-a}\overset{(R_1)_a}{\underset{|}{Si}}-H$$

wherein R$_1$ is a hydrogen or a monovalent hydrocarbon radical having 1 to 10 carbon atoms, X is a member selected from the group consisting of halogen, alkoxy radical, acyloxy radical, aminoxyl radical, phenoxy radical, thioalkoxy radical and amino radical and "a" is a whole number equal to 0, 1 or 2;

with a polymer or copolymer comprising 1 to 95 weight percent monomer or monomers (A) selected from the group consisting of methyl methacrylate, butyl acrylate, butyl methacrylate, styrene, acrylic acid, maleic acid anhydride, 2-ethyl-hexyl acrylate and mixtures thereof; and 99 to 5 weight percent of a monomer or monomers (B) selected from the group consisting of allyl methacrylate, allyl acrylate, and mixtures thereof; and wherein the main chain is a vinyl polymer having a molecular weight of between 200 to 30,000; and wherein said resulting vinyl polymer having a silyl group is substantially free of internal double bonds.

2. The process of claim 1, wherein component (A) is in an amount of between 30 to 93 weight percent, and component (B) is in an amount of between 7 to 70 weight percent.

3. The process of claim 1, wherein said hydrosilane compound is selected from the group consisting of halogenosilanes; alkoxysilanes, acyloxysilanes, triaminoxysilane, methyl diaminoxysilane and methyl diaminosilane.

4. The process of claim 1, wherein said monomers (A) are methyl methacrylate and n-butyl methacrylate; and said monomer (B) is allyl methacrylate; and wherein said hydrosilane compound is methyl dichlorosilane; and said catalyst is chloroplatinic acid.

5. The process of claim 1, wherein the molecular weight is between 1,500 and 25,000.

* * * * *